(12) United States Patent
Giralico et al.

(10) Patent No.: US 7,550,120 B2
(45) Date of Patent: Jun. 23, 2009

(54) CYLINDRICAL MIXER-SETTLER APPARATUS AND METHOD

(75) Inventors: Michael A. Giralico, Rochester, NY (US); Michael Joseph Preston, Churchville, NY (US)

(73) Assignee: SPX Corporation, Charlotte, NC (US)

( * ) Notice: Subject to any disclaimer, the term of this patent is extended or adjusted under 35 U.S.C. 154(b) by 840 days.

(21) Appl. No.: 11/041,197

(22) Filed: Jan. 25, 2005

(65) Prior Publication Data

US 2006/0165569 A1    Jul. 27, 2006

(51) Int. Cl.
*B01J 19/00* (2006.01)
*B01D 36/04* (2006.01)

(52) U.S. Cl. .................. 422/224; 210/335; 210/519; 210/521

(58) Field of Classification Search ............... 210/748, 210/741, 335, 194, 295, 299, 301, 320, 519, 210/521, 532.1; 422/224
See application file for complete search history.

(56) References Cited

U.S. PATENT DOCUMENTS

| | | | |
|---|---|---|---|
| 3,719,455 A * | 3/1973 | Iwatani et al. | 422/259 |
| 5,501,523 A | 3/1996 | Weetman et al. | 366/263 |
| 5,511,881 A | 4/1996 | Post et al. | 366/263 |
| 5,662,861 A * | 9/1997 | Taylor | 266/170 |

* cited by examiner

*Primary Examiner*—Walter D Griffin
*Assistant Examiner*—Cameron J Allen
(74) *Attorney, Agent, or Firm*—Baker & Hostetler LLP

(57) ABSTRACT

An embodiment of the invention includes a cylindrical settler having a longitudinal axis, a conical base centered on the longitudinal axis, a outer wall centered on the longitudinal axis, a mix tank centered on the longitudinal axis and within the outer wall, and a coalescence fence extending from the outer surface of the mix tank.

15 Claims, 7 Drawing Sheets

CYLINDRICAL MIXER-SETTLER APPARATUS AND METHOD

FIELD OF THE INVENTION

The present invention relates generally to an apparatus and method for emulsification and separation of liquids. More particularly, the present invention relates to a cylindrical mixer-settler for solvent extraction.

BACKGROUND OF THE INVENTION

Solvent extraction is used in many industrial processes to recover a desired product that is dissolved in a solvent stream. For example, the mining of copper employs a multi-step solvent extraction process which typically involves the leaching of copper from copper ore using an acidic aqueous solution to form a copper loaded leach liquor. The copper is typically extracted from the leach liquor by an organic solvent mixed with an organic extractant that is specific for copper. The copper loaded organic solvent is then stripped of copper by an acidic aqueous solution to form a copper loaded electrolyte solution. The copper loaded electrolyte solution is then sent to an electrowinning stage, where the copper is electroplated onto a copper cathode.

In order to transfer copper from one solvent to the next as previously described, the two solvents are thoroughly mixed to increase the surface area interface between the two solvent phases. The mixed solvents are then allowed to separate so that the two solvent phases can be transferred to the next stage of the extraction process without cross contamination of downstream solvent streams. In order to achieve phase separation as previously described, the mixed solvent stream is fed into a specially designed settler where the two phases are given enough time to properly separate. The settler is designed to enhance phase separation by providing a solvent flow that is slow in order to reduce turbulence, which has a tendency to remix the two phases. Furthermore, the slow solvent flow allows for an adequate residence time in the settler which assists in phase separation. In addition, the aforementioned settlers attempt to reduce the recirculation of the solvent stream because recirculation can reduce the effective size of the settler.

The aforementioned extraction process can have drawbacks, however. The organic solvent and extractant are relatively expensive, and furthermore, recirculation, which reduces the effective size of the settler, oftentimes results in the use of a larger settler than otherwise would be required. A larger settler has a larger working volume, requiring the use of a larger amount of solvent, which increases costs.

Accordingly, it is desirable to provide a method and apparatus for separation that produces little recirculation while providing a decelerated, unidirectional flow. It is further desirable to provide a cost efficient settler apparatus having an effective operational volume.

SUMMARY OF THE INVENTION

The foregoing needs are met, to a great extent, by the present invention, wherein in one aspect an apparatus is provided that in some embodiments, a cost efficient settler having an effective operational volume the produces little recirculation.

In accordance with one embodiment of the present invention, a cylindrical settler for use with a light phase material and a heavy phase material, having a longitudinal axis and a transverse plane generally perpendicular to the longitudinal axis is provided, comprising: a generally conical base centered on the longitudinal axis and lying generally in a first transverse plane; a cylindrical outer wall centered on the longitudinal axis and connected to the outer edge of the base, wherein the outer wall stands generally vertically; a cylindrical mix tank, centered on the longitudinal axis and inside the outer wall, configured to mix the light phase with the heavy phase; a discharge weir configured to receive overflow of the light phase; an outlet configured to receive outflow of the heavy phase; and a generally conical first coalescence fence, centered on the longitudinal axis, extending outwards from a first location on the exterior surface of the mix tank, configured to promote separation of the light phase from the heavy phase in a mixture of the light phase and the heavy phase materials.

In accordance with another embodiment of the present invention, a method of constructing a cylindrical settler for use with a light phase material and a heavy phase material, having a longitudinal axis and a transverse plane generally perpendicular to the longitudinal axis is provided, comprising: constructing a generally conical base centered on the longitudinal axis and lying generally in a first transverse plane; attaching a cylindrical outer wall centered on the longitudinal axis to the outer edge of the base, wherein the outer wall stands generally vertically; attaching a cylindrical mix tank, centered on the longitudinal axis and inside the outer wall, to the base; attaching a discharge weir configured to receive overflow of the light phase to the interior surface of the side wall; attaching an outlet configured to receive outflow of the heavy phase to the base; and attaching a generally conical first coalescence fence, centered on the longitudinal axis, to a first location on the exterior surface of the mix tank, wherein the first coalescence fence is configured to promote separation of the light phase from the heavy phase in a mixture of the light phase and the heavy phase materials.

In accordance with yet another embodiment of the present invention, a cylindrical settler having a longitudinal axis and a transverse plane generally normal to the longitudinal axis, comprising: means for mixing a light phase material and a heavy phase material, to form a mixture; means for drawing the light phase and the heavy phase into the mixing means; means for transferring the mixture to a cylindrical means for settling the material; means for separating the mixture into a light phase material and a heavy phase material; means for collecting overflow of the light phase; and means for collecting outflow of the heavy phase.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
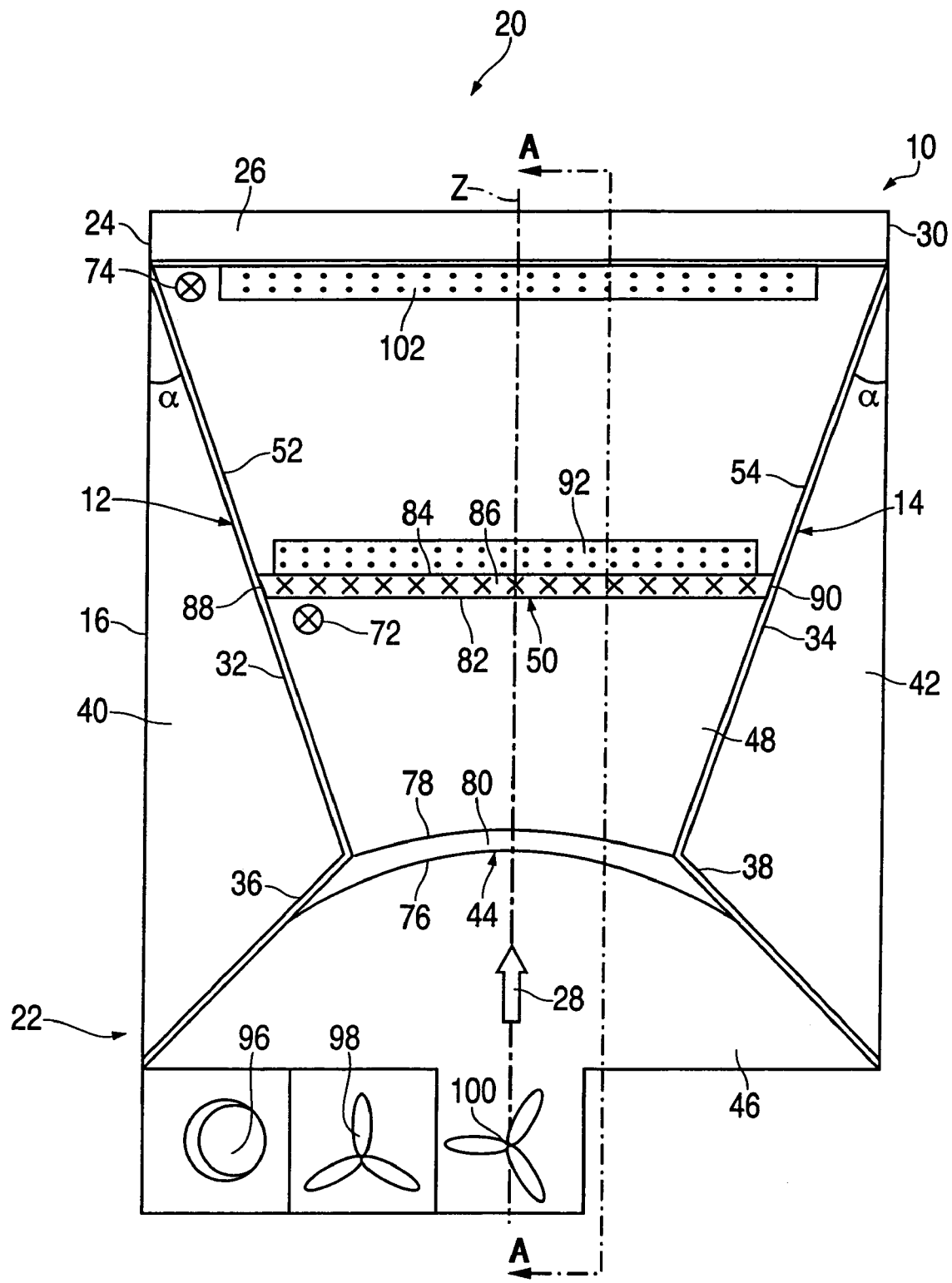
FIG. 1 is a top view of a retrofit trapezoid settler in accordance with an embodiment of the present invention.

The invention will now be described with reference to the drawing figures, in which like reference numerals refer to like parts throughout. One embodiment of the present invention provides a trapezoid settler for use with solvent extraction processes. While the apparatus and method are preferably used in solvent extraction processes, the trapezoid apparatus may be employed in various other separation processes that require the separation of fluid streams, for example.

An embodiment of the present apparatus is illustrated in FIG. 1. FIG. 1 is a top view of a trapezoid settler apparatus, generally designated 10, having a longitudinal axis Z. In the embodiment depicted, the trapezoid settler apparatus 10 includes side walls 12 and 14. As illustrated in FIG. 1, the sidewalls 12 and 14 engage sidewalls 16 and 18 of a standard rectangular settler that has been retrofitted, in accordance with the present invention, to provide a trapezoid configuration. However, as discussed in connection with FIG. 5 below, alternative embodiments of the present invention do not employ the side walls 16 and 18, for example, non-retrofit installations.

As illustrated in FIG. 1, the side wall 12 and 14 are generally symmetrical about the longitudinal axis Z. The side wall 12 has a downstream end 20 and an upstream end 22, wherein the downstream end 20 is connected to a first end 24 of a discharge weir assembly 26. The direction of solvent flow, generally designated 28 through the settler 10 is generally parallel to the longitudinal axis Z, starting from the upstream end 22 to the downstream end 20. Similarly, the side wall 14 also includes a downstream end, generally designated 20, and an upstream end, generally designated 22, wherein the downstream end 20 of the trapezoid settler 10 is connected to a second end 30 of the discharge weir assembly 26. The first side wall 12 and the second side wall 14 of the trapezoid settler 10 each have a first section 32 and 34, that are angled in a first direction inward toward one another away from walls 16 and 18. The angle α between the side walls 12 and 16 and the side walls 14 and 18 can range from zero to eighty two degrees, but the angle α is preferably between eleven and seventeen degrees. The side walls 12 and 14 also include a second section 36 and 38, as illustrated in FIG. 1, that is angled in a second opposite direction and extends toward the upstream end 22. The aforementioned orientation of the side walls 12 and 14 provide the settler apparatus 10 with a generally trapezoid shape. As illustrated in FIG. 1, the second sections 36 and 38 extend toward the upstream end 22 where they engage sidewalls 16 and 18 to define a cavity between walls 12 and 16, and 14 and 18, respectively. Fill, generally designated 40 and 42, is disposed between the two cavities formed between the side walls 12 and 16 and the side walls 14 and 18, providing additional structural stability. The fill 40 and 42 can be made of concrete, foam, resin, plastic, sand, or any other suitable material.

As depicted in FIG. 1, the second sections 36 and 38 of the side walls 12 and 14 are connected to a primary coalescence fence 44 which extends there between, dividing the trapezoid settler 10 into two compartments, an inlet compartment 46 and a main settler compartment 48. The main settler compartment 48 includes a secondary coalescence fence 50, positioned between the primary coalescence fence 44 and the discharge weir assembly 26. The secondary coalescence fence 50 extends between the side walls 12 and 14, wherein one end of the secondary coalescence fence 50 is connected to the inner face 52 of the side wall 12 while the other end of the secondary coalescence fence 50 is connected to the inner face 54 of the side wall 14.

Figure 2:
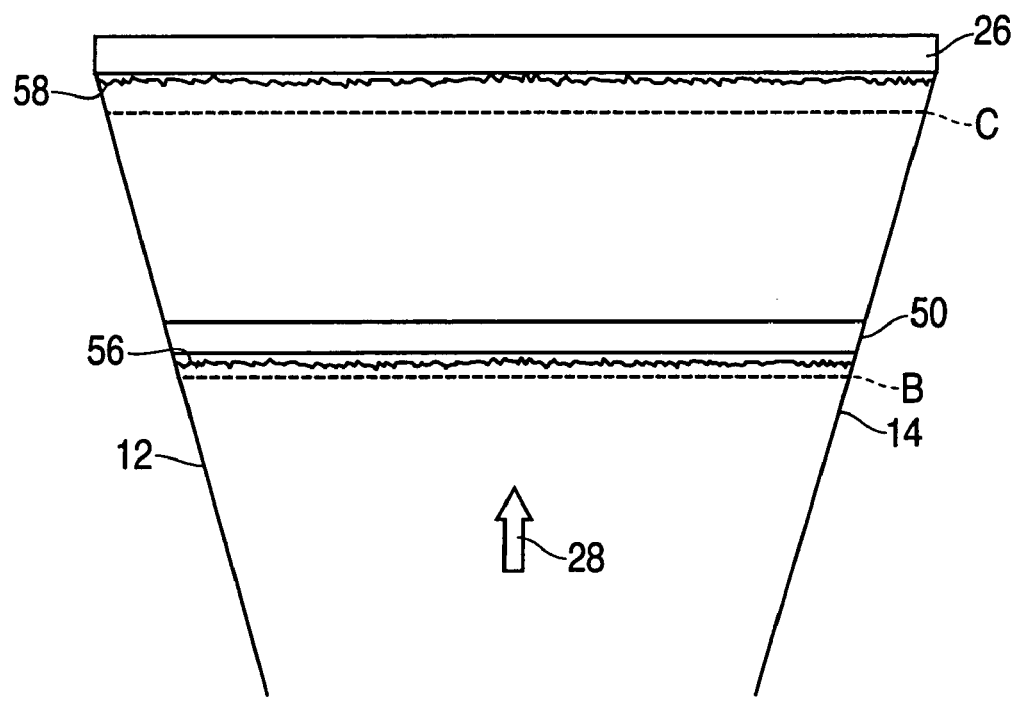
FIG. 2 is a top view of a portion of the trapezoid settler depicted in FIG. 1 with a secondary coalescence fence and a weir assembly, in accordance with one embodiment of the present invention.
Figure 3:
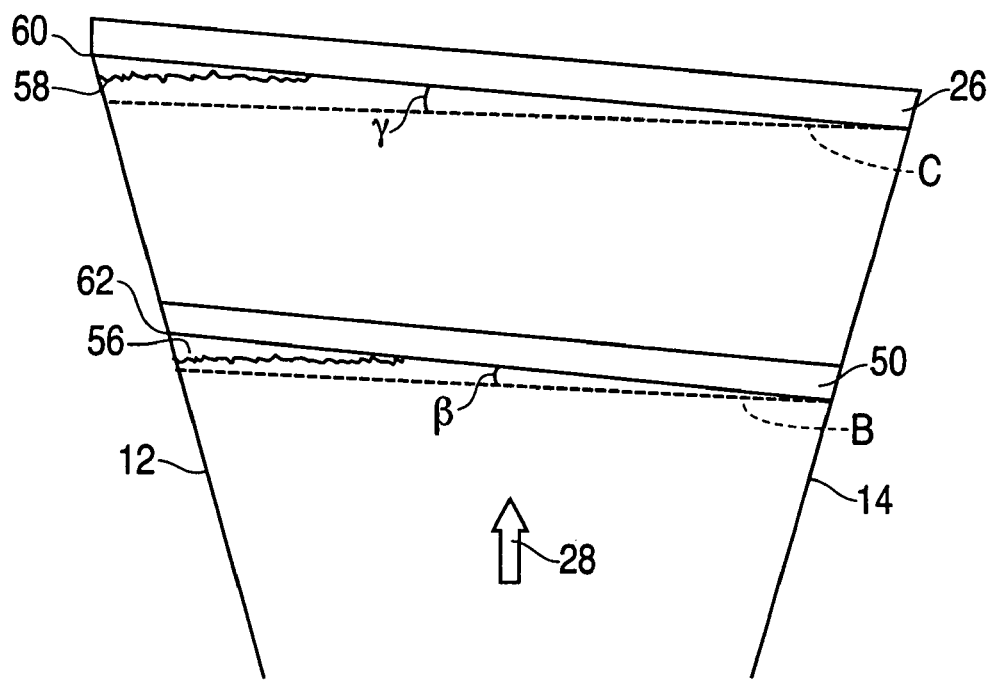
FIG. 3 is a top view of a portion of the trapezoid settler depicted in FIG. 1 with a secondary coalescence fence and a weir assembly oriented at an angle to the axial axis, in accordance with an alternative embodiment of the present invention.

Referring now to FIG. 2, an embodiment is depicted wherein the secondary coalescence fence 50 is oriented generally parallel to the transverse plane B whereas the weir assembly is oriented generally parallel to the transverse plane C. Alternatively, FIG. 3 depicts an embodiment of the present invention where the secondary coalescence fence 50 and discharge weir assembly 26 are positioned at angles β and γ to the transverse planes B and C, respectively. The angles β and γ are approximately zero degrees to approximately ten degrees. More preferably, the angles β and γ are approximately one degree to approximately two degrees. The angled surface of the secondary coalescence fence 50 and discharge weir assembly 26 function to funnel crud 56 and 58 into the downstream corner 60, formed by the intersection between the discharge weir assembly 26 and the side wall 12, and the downstream corner 62 formed by the intersection between the secondary coalescence fence 50 and the side wall 12.

Figure 4:
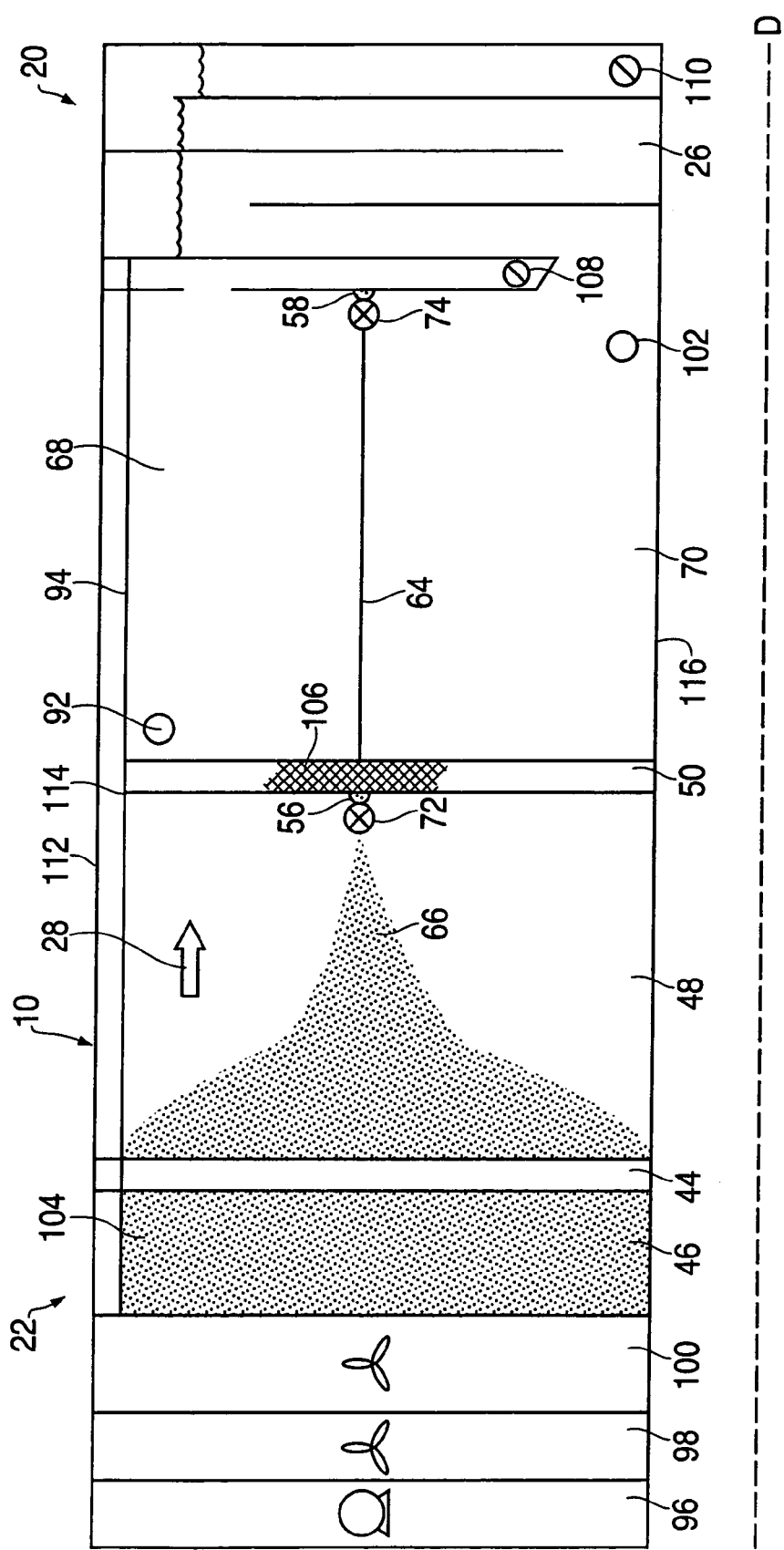
FIG. 4 is a cross-sectional view of a trapezoid settler depicted in FIG. 1 taken along line A-A.

Referring now to FIG. 4, a cross-sectional view along line A-A of the trapezoid settler apparatus 10 illustrated in FIG. 1 is depicted. The direction of solvent flow 28, through the settler 10 as indicated, is from the upstream end 22 to the downstream end 20. During operation of the settler apparatus 10, crud 56 and 58, which is can include entrapped air, solid particulates, and associated liquids, can collect at the interface 64 or dispersion band 66 between the liquid phases 68 and 70. Due to the aforementioned angled configuration, crud 56 and 58 generally collects at the downstream corners 60 and 62 as previously described in connection with FIG. 3. At each corner 60 and 62, a crud removal system 72 and 74 is preferably employed, as illustrated in FIG. 4. The crud removal systems 72 and 74 use an automated differential float to trigger a diaphragm pump to withdraw the crud 56 and 58 for a set time period based on a pre-programmed low level set point. The aforementioned removal of the crud 56 and 58 helps to prevent the likelihood of the contamination of the downstream processes which can affect the purity of the final product. The aforementioned removal of the crud 56 and 58 also helps to prevent the likelihood of disruption of the coalescence process, wherein the crud 56 and 58 can interfere with the transfer of one phase to the other phase at the interface 64. These crud removal systems 72 and 74 may also be employed in the embodiment depicted in FIG. 2.

As illustrated in FIGS. 1 and 4, the primary coalescence fence 44 has an upstream inlet screen 76, a downstream outlet screen 78, and media 80 disposed between the inlet screen 76 and outlet screen 78. Under hydrophobic conditions, the inlet screen 76, the outlet screen 78, along with the media 80 are preferably made of metal, for example steel or stainless steel. The inlet screen 76 and outlet screen 78 are made from an expanded metal grating or perforated metal mesh when employed under hydrophobic conditions. The packed media 80 is preferably made of packed metal filaments. Alternatively, the inlet screen 76, the outlet screen 78 and the packed media 80 of the primary coalescence fence 44 can be constructed from plastic or fiber reinforced plastic under hydrophilic conditions. For example, the inlet screen 76 and outlet screen 78 may be made from a molded or extruded plastic grating or mesh, or a molded or extruded fiber reinforced plastic grating or mesh. Under these conditions, the packed media 80 is similarly made of packed plastic or packed plastic filaments. Although the packed media is made of metal or plastic in the above-described embodiments of the invention, the packed media can alternatively be constructed from glass or any other suitable material The primary coalescence fence 44 is preferably designed with computational fluid dynamics to achieve relatively uniform flow velocity out of the outlet screen 78. Both the slot size and/or pore size of the inlet screen 76 and outlet screen 78 can be varied to control headloss, which aids coalescence, and provides a relatively uniform flow velocity. Although the primary coalescence fence 44 is generally parabolic in shape in the embodiments as depicted in FIGS. 1 and 4, the fence 44 can be any desired configuration such as trapezoid, angled, or some other suitable shape or configuration which aids in achieving relatively uniform flow velocity.

The secondary coalescence fence 50, as illustrated in FIGS. 1 and 4, is preferably constructed from a single variable permeability screen. Though a variable permeability screen is preferred, a secondary coalescence fence 50 having a three layer design with an inlet screen 82, an outlet screen 84, and packed media 86 in between the inlet screen 82 and the outlet screen 84, as previous described, may also be used. The secondary coalescence fence 50 may also be designed using computational fluid dynamics to provide a design that both holds and controls the dispersion band 66 located between the light phase 68 and heavy phase 70.

As illustrated in FIGS. 1 and 4, the secondary fence 50 includes jacking screws 88 and 90 at both ends, allowing the fence height to be adjusted to correspond with the location of the dispersion band 66. This adjustment helps to prevent the top of the secondary coalescence fence 50 from breaking the liquid surface 94, while allowing one to adjust the distance of the bottom of the secondary coalescence fence 50 from the base 116 of the settler 10.

Referring to FIG. 4, a light phase recycle launder 92 is depicted. The light phase recycle launder 92 is located on the back side of the secondary coalescence fence 50, just below the liquid surface 94. The light phase recycle launder 92 preferably includes a perforated pipe and manifold assembly that allows a portion of the light phase 68 to be piped back to pumper-mixer tanks 96, 98, and 100.

The settler apparatus 10 as illustrated in FIG. 1, also includes a heavy phase recycle launder 102 that is located opposite the light phase recycle launder 92, on the front side of the discharge weir assembly 26, near the bottom of the settler 10. The heavy phase recycle launder 102 similarly comprises a perforated pipe and manifold assembly that allows a portion of the heavy phase 70 to be piped back to the pumper-mixer tanks 96, 98, and 100.

The recycle launders 92 and 102 generally provide for increased control over the extraction process. For example, increasing the rate of recycle of the process stream generally increases the efficiency of extraction. In effect, the recycled portion of the process stream is subjected to a second extraction. The recycle launders 92 and 102 also generally help to dampen the effects to downstream processes from fluctuations in upstream process conditions.

As previously discussed, FIG. 4 is a cross-sectional view of the settler apparatus 10 along line A-A. During operation of the settler apparatus 10, the pumper-mixers 96, 98, and 100 mix the light phase 68 and heavy phase 70 to form a light-heavy mixture 104. The mixers 98 and 100 are preferably impellers, and the mixers 98 and 100 can be placed in separate mixing tanks or in a tank combined with the pumper 96. The mixture 104 is then fed into the inlet compartment 46 by the pumper-mixers 96, 98, and 100. The mixture 104 then proceeds to pass through the primary coalescence fence 44, which provides the initial headloss that aids coalescence, along with providing a relatively uniform velocity flow out of the fence 44 and into the main settler compartment 48. As the mixture 104 coalesces into two separate phases 68 and 70 as indicated in FIG. 4, a dispersion band 66 of the remaining unseparated mixture 104 forms between the light phase 68 and the heavy phase 70.

The mixture 104 then passes through the secondary coalescence fence 50. As previously mentioned, the height of the secondary coalescence fence 50 may be adjusted with the jacking screws 88 and 90 so that the controlling media 106 of the fence 50 is aligned with the dispersion band 66. This realignment allows for the dispersion band 66 to be located near the front side of the secondary coalescence fence 50, enabling the crud removal system 72 to remove the crud accumulation 56 at the fence 50.

Once the mixture 104 passes through the secondary coalescence fence 50, it is substantially separated into a light phase 68 and heavy phase 70 with an interface 64 there between. At this stage, a portion of the light phase 68 is fed back into the pumper mixer 96, 98, and 100 by the light phase recycle launder 92, as previously described. The separated mixture 104, with the light phase 68 and heavy phase 70, then passes into the discharge weir assembly 26, which collects the light phase 68 in a first drain 108 and the heavy phase 70 in a second drain 110.

As illustrated in FIG. 4, a second crud removal system 74 is positioned at the front of the discharge weir assembly 26 and at the interface 64. The second crud removal system 74 functions to remove the crud accumulation 58 located at the weir assembly 26. In addition, a portion of the heavy phase 70 is fed back into the pumper mixer 96, 98, and 100 by the heavy phase recycle launder 102.

Referring to FIG. 4, a cover 112 is preferably placed over the settler 10 in the embodiment depicted. The cover 112 functions to reduce evaporation of the light phase 68, reduce air 114 entrainment by reducing the agitation of the liquid surface 94, and to reduce the contamination of the two phases 68 and 70 by particulate matter. Though a cover 112 is preferred, alternative embodiments may not employ a cover 112 or covering means.

As illustrated in FIG. 1, the settler apparatus 10 also includes a base 116 that lies substantially in a horizontal plane D, but in other embodiments encompassed by the present invention, the base 116 may be sloped either upward at an angle to the plane, or downward at an angle to the plane. The aforementioned sloped configuration allows further control of the phase flows, interfacial velocities, and coalescence.

Figure 5:
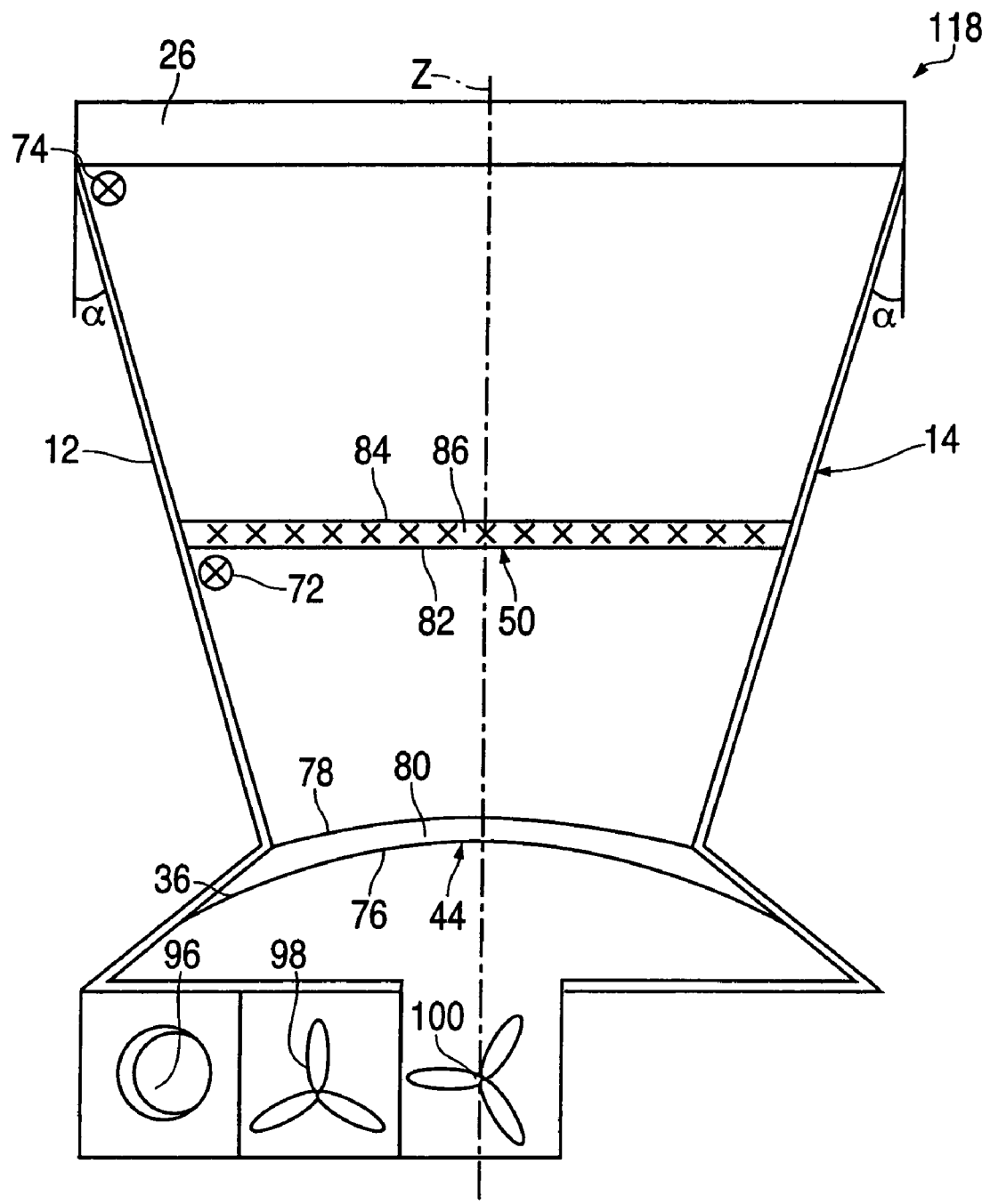
FIG. 5 is a top view of a trapezoid settler in accordance with another embodiment of the present invention.

Referring now to FIG. 5, a top view of a trapezoid settler 118, similar to the embodiments depicted in FIGS. 1-4, is illustrated in accordance with an alternative embodiment of the invention. Whereas the embodiments depicted in FIGS. 1-4 illustrate a trapezoid settler apparatus 10 resulting from the retrofitting of a rectangular settler, the embodiment illustrated in FIG. 5 is a non-retrofitted embodiment. As illustrated in FIG. 5, the settler apparatus 118 contains only the sidewalls 12 and 14.

Figure 6:
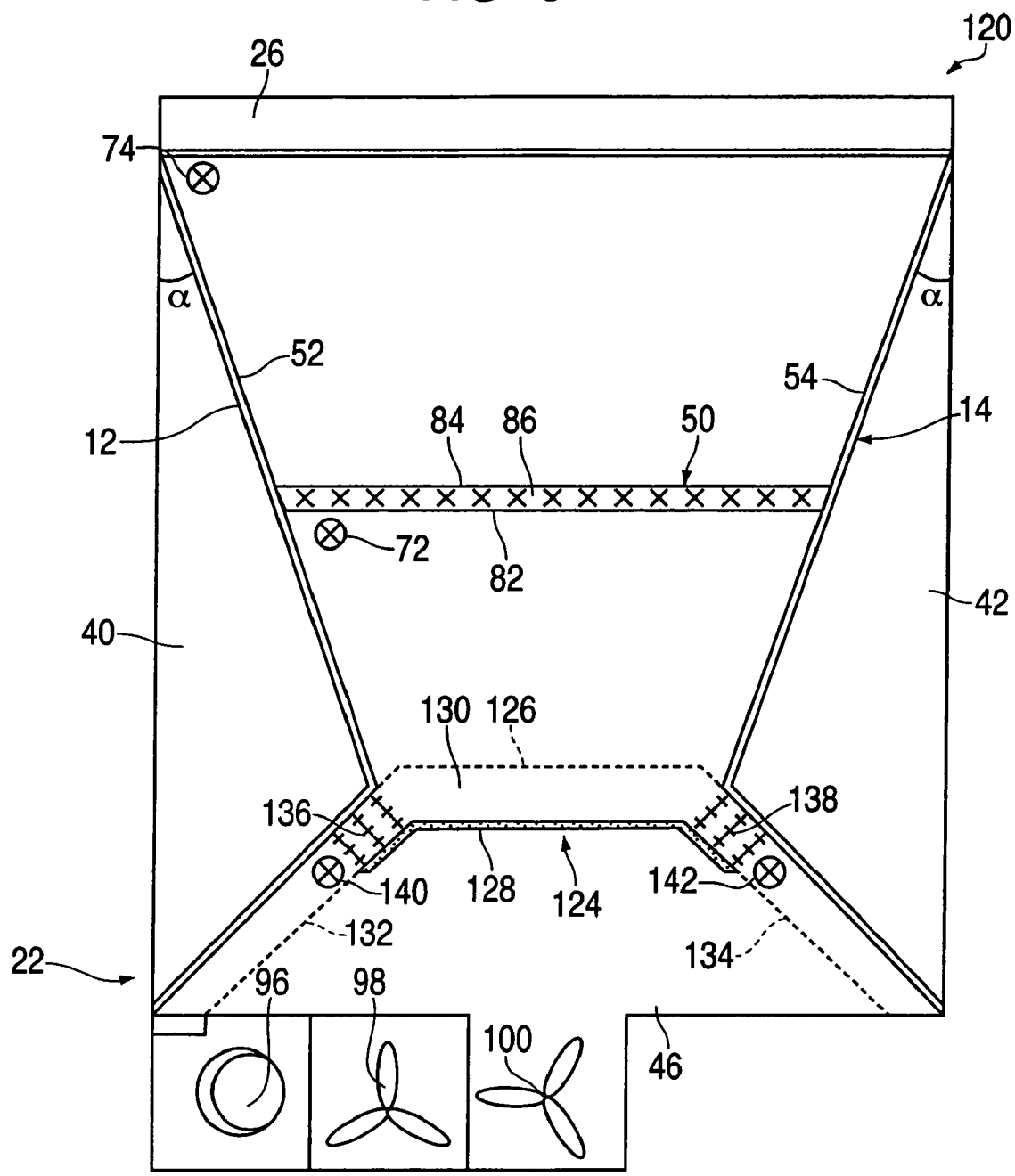
FIG. 6 is a top view of a trapezoid settler with an influent channel distributor in accordance with yet another embodiment of the present invention.
Figure 7:
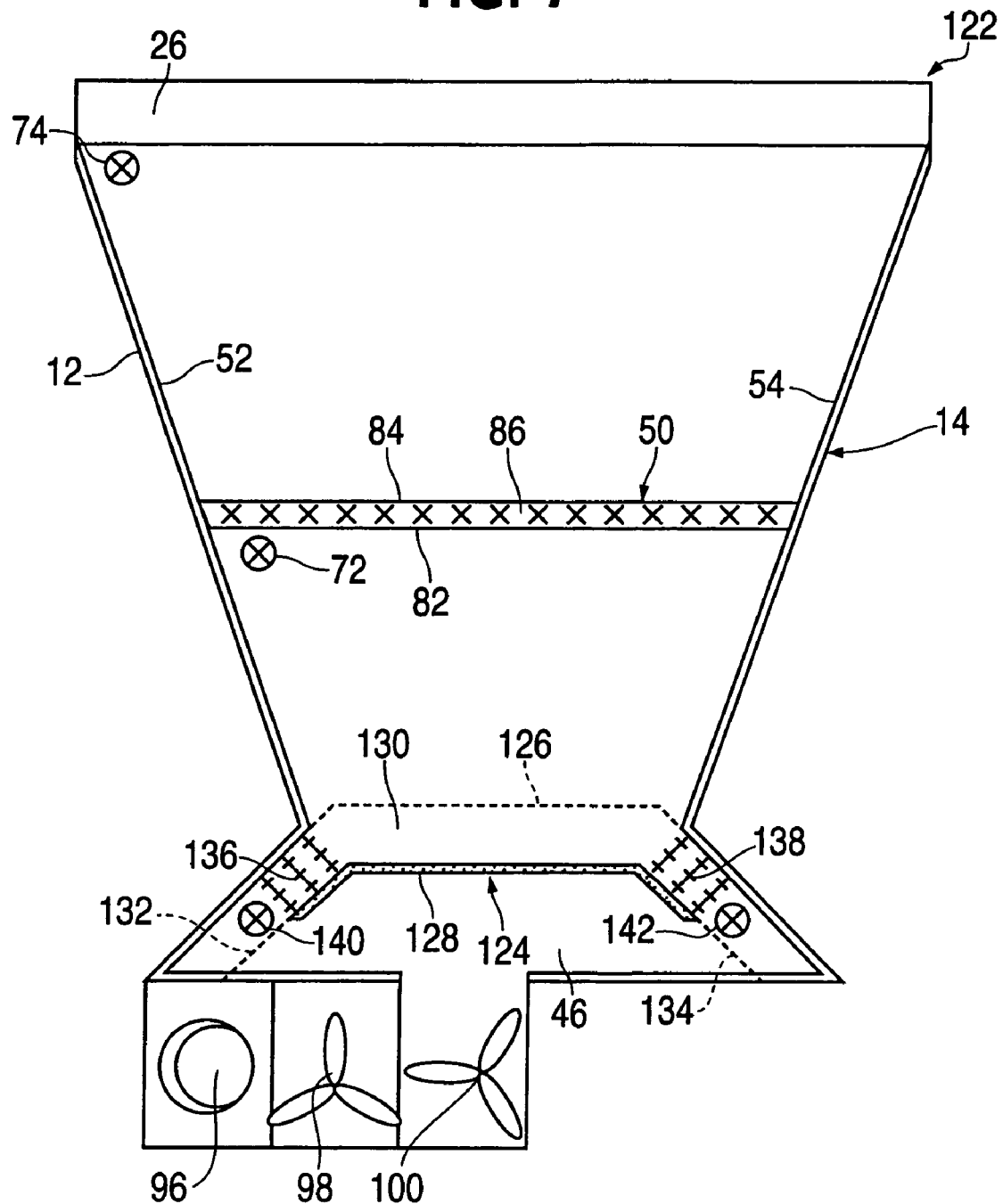
FIG. 7 is a top view of a trapezoid settler with an influent channel distributor in accordance with still another embodiment of the present invention.

Referring now to FIGS. 6 and 7, FIG. 6 depicts a retrofit trapezoid settler 120 with an influent channel distributor 124 while FIG. 7 depicts a non-retrofit trapezoid settler 122 with an influent channel distributor 124. The trapezoid settlers 120 and 122 depicted in FIGS. 6 and 7 are similar to those embodiments previously discussed except they have an influent channel distributor 124 rather than the primary coalescence fence 44. The influent channel distributor 124 functions to channel influent flow to the sides 12 and 14 of the inlet compartment 46 of the settlers 120 and 122.

As illustrated in FIGS. 6 and 7, the influent channel distributor 124 has an outlet screen 126 extending from the inner face 52 of the first side wall 12 to the inner face 54 of the second side wall 14. The settlers 120 and 122 also include a barrier 128 that is located upstream of the outlet screen 126, which functions to divert flow to the sides of the inlet compartment 46. The barrier 128 combines with the outlet screen 126 to form a channel 130 located between the outlet screen 126 and the barrier 128. The barrier 128 includes two inlet screens 132 and 134, each connected to one of its ends, which are preferably offset from the sides of the inlet compartment 46 as illustrated in FIG. 7. The inlet screens 132 and 134 function as gateways to the channel 130 and also provide for headloss and aid in coalescence. The channel 130 also includes media 136 and 138 which is disposed within the right and left portions of the channel 130. The packed media 136 and 138 functions to provide additional headloss and also aids in coalescence. Crud removal systems 140 and 142 can be placed just upstream of the packed media 136 and 138, as illustrated, in order to remove crud accumulation in the channel 130, however the crud removal systems 140 and 142 are not required.

Fabrication and/or construction of the settler 10 embodiments depicted in FIGS. 1-7 can be accomplished using metal, plastic, fiber reinforced plastic or any other suitable material as desired. Connections between parts can be accomplished by welding, bolting, riveting, screwing, or any other suitable method as desired.

Also, although an example of the trapezoid settler 10 is shown using parabolic primary coalescence fence 44, it will be appreciated that other fence designs can be used. Furthermore, although the trapezoid settler 10 is useful to separate an organic phase from an aqueous phase, it can also be used to separate to immiscible organic phases, for example.

Figure 8:
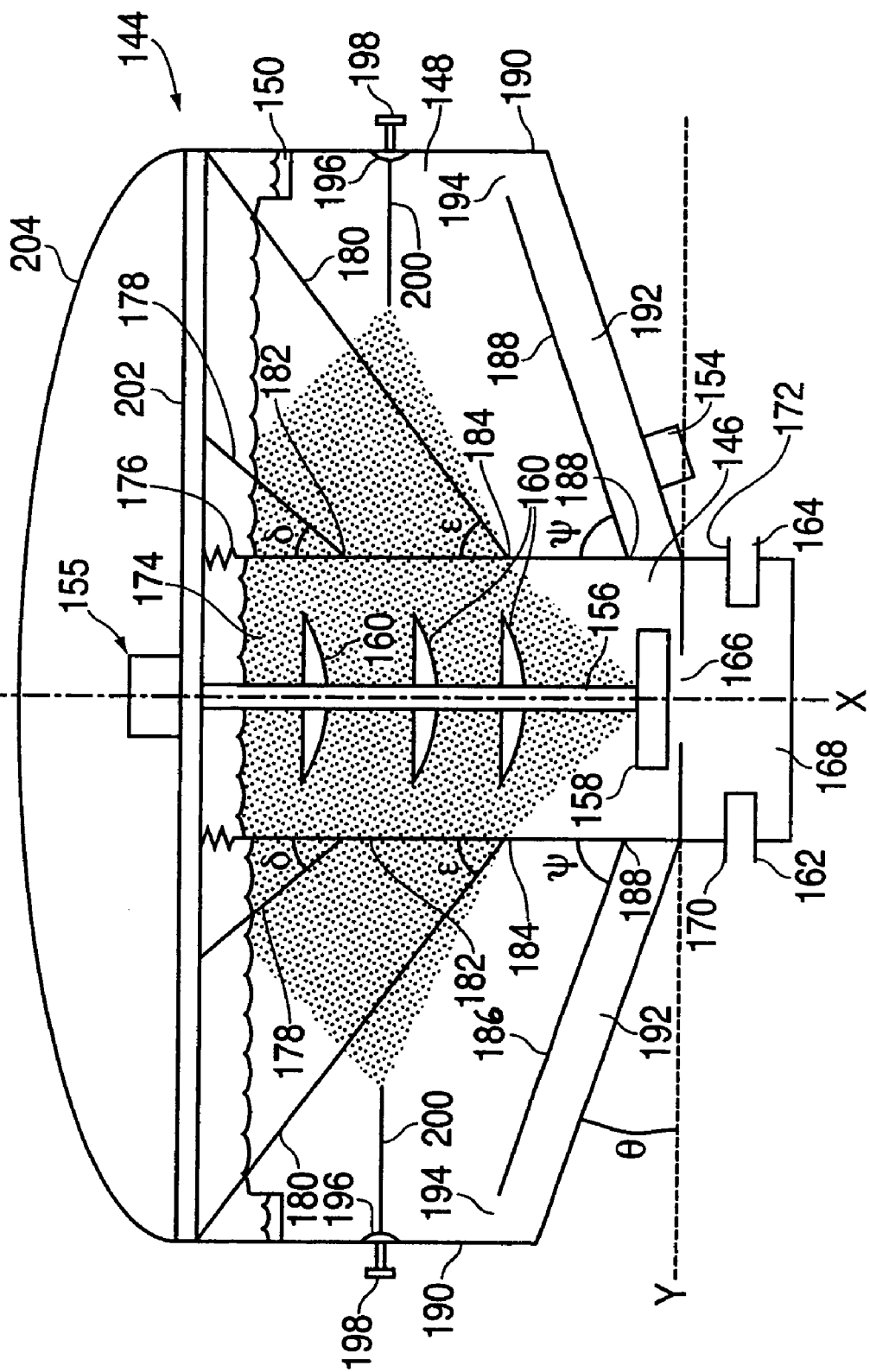
FIG. 8 is a cross-sectional view of a cylindrical settler in accordance with still another embodiment of the present invention.

An alternative embodiment of the present invention is depicted in FIG. 8. FIG. 8 depicts a cylindrical mixer-settler apparatus 144 with a longitudinal axis X of rotation. The cylindrical mixer-settler apparatus 144 includes a cylindrical mix tank 146 that is also centered on the longitudinal axis X. In addition, an annular settler compartment 148 surrounds the mix tank 146. A light phase discharge weir 150 is located around the outside circumference of the settler compartment 148. The cylindrical settler apparatus 144 has a conical basin 152 that is oriented at an angle θ to the transverse plane Y. The conical shape of the basin 152 is configured to aid in the separation of the light phase 162 and heavy phase 164 by reducing the likelihood of cross contamination and short circuiting of the two phases 162 and 164 during the separation process. A heavy phase discharge outlet 154 is located on the basin 152.

As illustrated in FIG. 8, a mixer 155 comprising a drive shaft 156 oriented with the longitudinal axis X is disposed in the mix tank 146. A pumper impeller 158 is attached to the drive shaft 156 and is disposed near the bottom of the mix tank 146. Three mixer impellers 160 are attached at three intermediate locations along the drive shaft 156. As the drive shaft 156 is rotated, the pumper impeller 156 draws both the light phase 162 and the heavy phase 164 through an inlet port 166 that connects the mix tank 146 with the premix chamber 168. The light phase 162 and heavy phase 164 are fed into the premix chamber 168 by two separate pipes, a light phase feed pipe 170 and a heavy phase feed pipe 172. As the light phase 162 and heavy phase 164 are drawn into the mix tank 146, the two phases 162 and 164 are mixed together by the mixer impellers 160 to form a mixture 174.

As illustrated in FIG. 8, before the mixture 174 passes from the mix tank 146 to the settler compartment 148, the mixture 174 passes through an inlet fence 176 that is configured to provide a substantially even flow of mixture 174 into the settler compartment 148. The inlet fence 176 can be a fence with holes, slits or other shaped openings and can be constructed from metals, fiber reinforced plastic, ceramics, plastics or other suitable materials.

Once the mixture 174 enters the settler compartment 148, it travels in a generally radial direction and passes through a primary coalescence fence 178 and a secondary coalescence fence 180 as shown in FIG. 8. The primary coalescence fence 178 is positioned at an angle δ with respect to the vertical axis X, and is attached to a first location 182 on the exterior of the mix tank 146. The secondary coalescence fence 180 is positioned at an angle ε with respect to the vertical axis X, and is attached to a second location 184 on the exterior of the mix tank 146. Both the primary coalescence fence 178 and the secondary coalescence fence 180 are generally cone shaped as shown in FIG. 8. The construction of the two fences 178 and 180 is similar to the fences described previously in FIGS. 1-7, and the two fences 178 and 180 are configured to perform similar functions as the fences described previously in FIGS. 1-7.

As illustrated in FIG. 8, the mixture 174 is substantially separated into a light phase 162 and heavy phase 164 after the mixture 174 is passed through the secondary coalescence fence 180. The light phase 162 is collected in a light phase discharge weir 150, while the heavy phase 164 is collected from the bottom of the settler compartment 148 by a heavy phase discharge outlet 154. A barrier 186 is located near the settler basin 152, and is configured to reduce the likelihood of light phase contamination through the heavy phase discharge outlet 154. The barrier 186 is attached at a third location 188 to the exterior of the mix tank 146 and is positioned at an angle ψ to the vertical axis X. The barrier 186 extends nearly to the outer wall 190 of the settler compartment 148, forming a heavy phase channel 192 with an inlet 194 adjacent to the outer wall 190. The heavy phase must travel to the outer wall 190, pass through the inlet 194 and travel through the heavy phase channel 190 before it reaches the heavy phase discharge outlet 154. The barrier 186 increases the path length, and thus the time, that a fluid must take before it reaches the heavy phase discharge outlet 154. This allows potential light phase 162 contamination more time to separate and rise to the top of the settler 144. The angle ψ is less than 90 degrees, so that light phase 162 contamination in the heavy phase channel 192 can rise and return to the top of the settler 144. The barrier 186 is constructed of an impermeable material, such as plastic, metal, fiber reinforced plastic or any other suitable material, and is generally cone shaped.

As shown in FIG. 8, accumulation of crud 196 at the outer wall 190 of the settler compartment 148 can be removed using a plurality of crud outlet nozzles 198 positioned around the outer wall 190. Alternatively, an automatic crud removal system, as described previously in FIGS. 1-7, can be used instead. Because accumulation of crud 196 occurs at the interface 200 between the two phases 162 and 164, use of fixed position outlet nozzles 198 for removal of crud 196 makes control of the interface 200 location important. This can be done by controlling the feed rate and removal rate of the two phases 162 and 164 into and out of the settler 144. Alternatively, use of the automatic crud removal system described previously in FIGS. 1-7 would allow flexibility in the interface 200 location, and would be accommodating to a wide range of process conditions.

As shown if FIG. 8, a support beam 202 provides mechanical support and stability to the mixer 155. A cover 204 is used to reduce contamination of the process and to reduce evaporation of the phases 162 and 164. The support beam 202 and cover 204 can be constructed from any suitable material, including but not limited to steel, other metals, plastic, or fiber reinforced plastic.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A cylindrical settler for use with a light phase material and a heavy phase material, having a longitudinal axis and a transverse plane generally perpendicular to the longitudinal axis, comprising:
    a generally conical base centered on the longitudinal axis and lying generally in a first transverse plane;
    a cylindrical outer wall centered on the longitudinal axis and connected to the outer edge of the base, wherein the outer wall stands generally vertically;
    a cylindrical mix tank, centered on the longitudinal axis and inside the outer wall, configured to mix the light phase with the heavy phase;
    a discharge weir configured to receive overflow of the light phase;
    an outlet configured to receive outflow of the heavy phase; and
    a generally conical first coalescence fence, centered on the longitudinal axis, extending outwards from a first location on the exterior surface of the mix tank, configured to promote separation of the light phase from the heavy phase in a mixture of the light phase and the heavy phase materials.

2. The cylindrical settler of claim 1, wherein the mix tank is comprised of:
    a driveshaft centered on and aligned with the longitudinal axis;
    a pumper impeller, attached to the driveshaft, configured to draw a first phase and a second phase into the mix tank; and
    at least one mixer impeller, attached to the driveshaft, configured to mix the first phase with the second phase.

3. The cylindrical settler of claim 1, wherein the first coalescence fence comprises:
    a first screen;
    a second screen oriented generally parallel to the first screen; and
    a media disposed between the first screen and the second screen.

4. The cylindrical settler of claim 3, wherein the inlet screen, the outlet screen, and the media are metal.

5. The cylindrical settler of claim 4, wherein the inlet screen, the outlet screen, and the media are plastic.

6. The cylindrical settler of claim 1, further comprising a second coalescence fence, centered on the longitudinal axis, extending outwards from a second location on the exterior surface of the mix tank, configured to promote separation of the light phase from the heavy phase in a mixture of the light phase and heavy phase materials.

7. The cylindrical settler of claim 6, wherein the second coalescence fence comprises a variable permeability screen.

8. The cylindrical settler of claim 1, further comprising a generally conical flow redirection barrier extending from a third location on the exterior surface of the mix tank to a distance just short of the outer wall.

9. The cylindrical settler of claim 1, further comprising at least one crud outlet nozzle configured to remove crud accumulation at the outer wall.

10. The cylindrical settler of claim 1, further comprising a cover configured to reduce the introduction of contaminants into the settler.

11. A method of constructing a cylindrical settler for use with a light phase material and a heavy phase material, having a longitudinal axis and a transverse plane generally perpendicular to the longitudinal axis, comprising:
    constructing a generally conical base centered on the longitudinal axis and lying generally in a first transverse plane;
    attaching a cylindrical outer wall centered on the longitudinal axis to the outer edge of the base, wherein the outer wall stands generally vertically;
    attaching a cylindrical mix tank, centered on the longitudinal axis and inside the outer wall, to the base;
    attaching a discharge weir configured to receive overflow of the light phase to the interior surface of the side wall;
    attaching an outlet configured to receive outflow of the heavy phase to the base; and
    attaching a generally conical first coalescence fence, centered on the longitudinal axis, to a first location on the exterior surface of the mix tank, wherein the first coalescence fence is configured to promote separation of the light phase from the heavy phase in a mixture of the light phase and the heavy phase materials.

12. The method of claim 11, further comprising attaching a second coalescence fence, centered on the longitudinal axis, to a second location on the exterior surface of the mix tank, wherein the second coalescence fence is configured to promote separation of the light phase from the heavy phase in a mixture of the light phase and the heavy phase materials.

13. The method of claim 11, further comprising attaching a generally conical flow redirection barrier to a third location on the exterior surface of the mix tank, wherein the flow redirection barrier extends to a distance just short of the outer wall.

14. The method of claim 11, further comprising attaching a cover that extends over the outer wall, mix tank and base, wherein the cover is configured to reduce the introduction of contaminants into the settler.

15. The method of claim 11, further comprising attaching at least one crud outlet nozzle to the outer wall, wherein the crud outlet nozzle is configured to remove crud accumulation at the outer wall.

* * * * *